United States Patent [19]

Lauritzen et al.

[11] Patent Number: 4,941,678
[45] Date of Patent: Jul. 17, 1990

[54] LIGHTWEIGHT REACTION CAN FOR PASSENGER INFLATORS

[75] Inventors: Donald R. Lauritzen, Hyrum, Utah; Michael J. Ward, Howell, Mich.; Scott R. Anderson, Syracuse, Utah

[73] Assignee: Morton Thiokol, Inc., Chicago, Ill.

[21] Appl. No.: 373,318

[22] Filed: Jun. 29, 1989

[51] Int. Cl.⁵ .............................................. B60R 21/12
[52] U.S. Cl. .................................. 280/732; 280/743; 220/89 A; 220/4 R; 220/375
[58] Field of Search .............. 280/743, 728, 730, 732, 280/734, 735, 736, 737; 220/89 A, 4 R, 375

[56] References Cited

U.S. PATENT DOCUMENTS 4,842,300  6/1989  Ziomek et al. ...................... 280/743

FOREIGN PATENT DOCUMENTS 58-110339  6/1989  Japan ..................................... 280/730

Primary Examiner—David M. Mitchell
Assistant Examiner—Karin Tyson
Attorney, Agent, or Firm—Gerald K. White

[57] ABSTRACT

A lightweight can assembly for housing and protecting the gas generator and inflatable bag of a passenger side restraint system includes a tether in the bag flush with the mouth of the can and at its center which retains the spreading forces at the mouth of the can upon bag deployment. This allows for a lighter section at the mouth of the can and eliminates the need for flanges along the sides of the can, which flanges would undesirably increase the envelope.

8 Claims, 4 Drawing Sheets

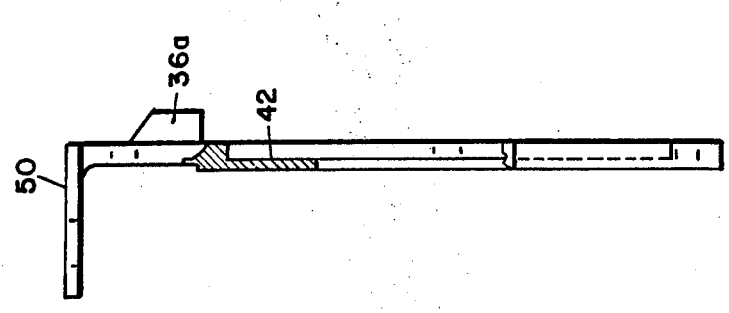
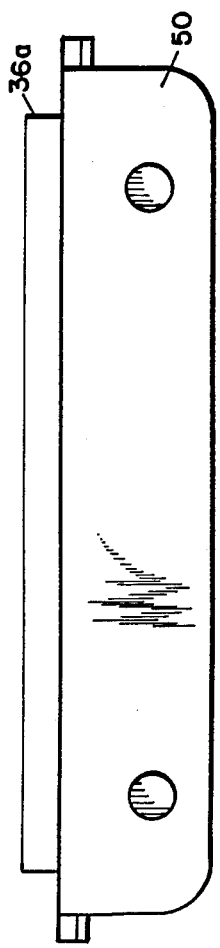
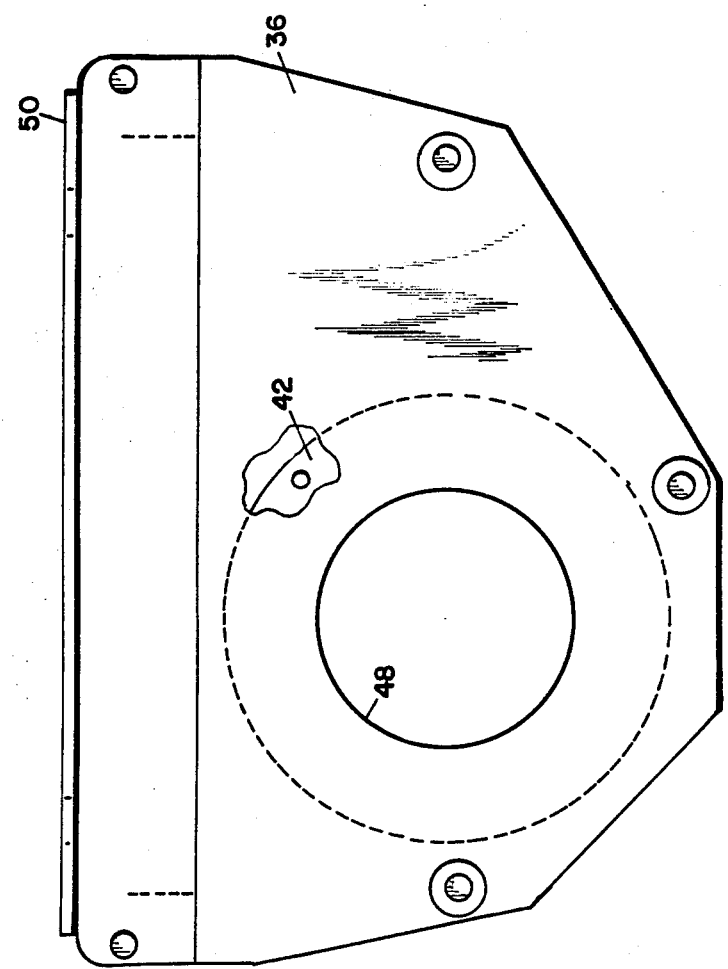

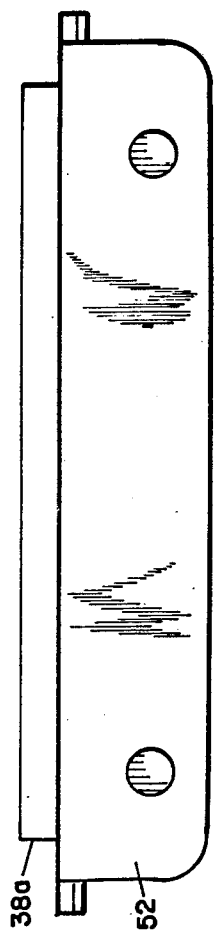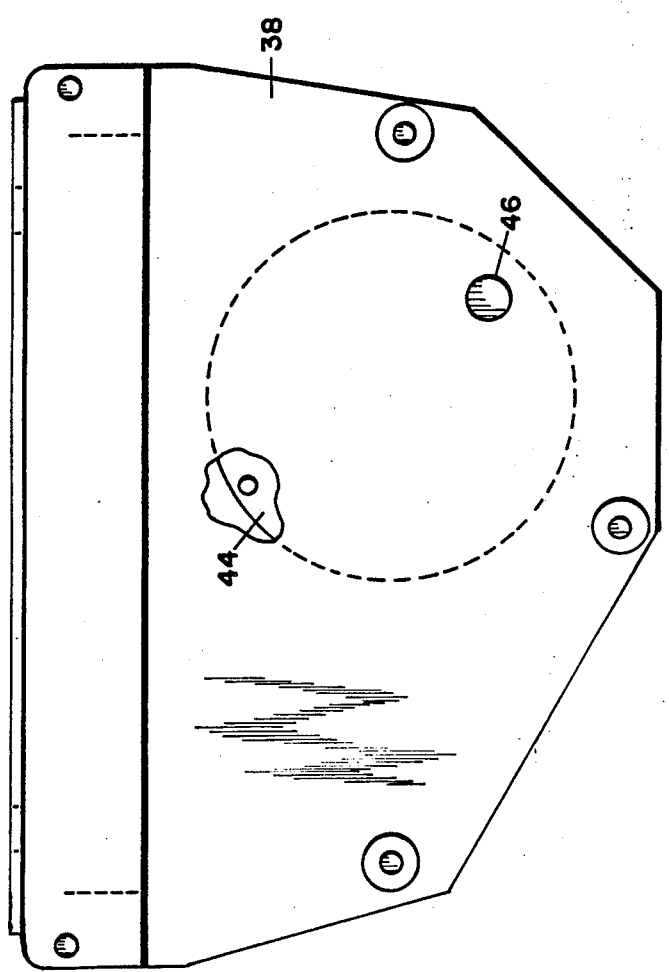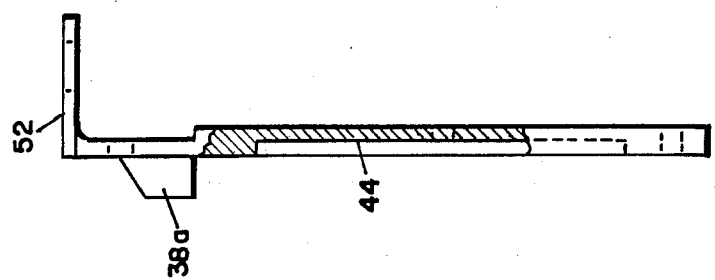

LIGHTWEIGHT REACTION CAN FOR PASSENGER INFLATORS

BACKGROUND OF THE INVENTION

1. Field of the Invention

This invention relates to an inflation passive restraint system for use in an automobile for restraining the movement of a seated occupant during a collision, and more particularly, to an improvement in the structure for housing and positioning the gas generator and inflatable bag on the passenger side of the vehicle.

2. Description of the Prior Art

The housing structure of a vehicle passive restraint system provides protection for the gas generator and the inflatable bag until the time of deployment of the latter. Additionally, it absorbs the loads generated by deployment of the bag. These loads are large and unless sufficiently absorbed can cause damage to the vehicle interior including dash panel parts. Thus, it has been the practice in the prior art to use heavyweight, and in particular steel, structures for housing and positioning passenger inflators to prevent such damage.

Emphasis on weight reduction in automobiles has created a need, and a demand, for a lighter weight passenger side inflation passive restraint system. It has been determined that a most significant weight reduction in the sytem can be achieved by the substitution of aluminum for the heavy steel structure used to house and position the gas generator and the inflatable bag. Aluminum already is being used in the external housing as well as the internal structure of gas generators. Such usage is disclosed in U.S. Pat. No. 4,547,342, issued Oct. 15, 1985 and U.S. Pat. No. 4,561,675, issued Dec. 31, 1985 to Gary V. Adams et al. for driver inflation passive restraint systems and in application for U.S. patent bearing Ser. No. 372,994 filed June 29, 1989 by Donald R. Lauritzen et al. for passenger side inflation passive restraint systems. The Adams et al. patents and the Lauritzen application are assigned to the assignee of the present invention.

SUMMARY OF THE INVENTION

An object of the invention is to provide improvements in the structure for housing and positioning the gas generator and inflatable bag of a passenger side inflation passive restraint system that enable a significant reduction in the weight of the restraint system to be made.

Another object of the invention is to provide a structure embodying such improvements, specifically, a simple can assembly, hereinafter termed a reaction can, which meets the high reliability standards of a safety device and at the same time can be manufactured in high production rates at low cost.

In accomplishing these and other objectives of the invention, there is provided a lightweight reaction can for housing and positioning the gas generator and inflatable bag of a passive restraint system comprising a trough shaped body part and a plate for each end thereof. The fabrication of the body part is of continuous aluminum extrusion in accordance with techniques known in the art. This enables the provision of a light strong body part with thickening of material weight only where it is needed. Being a continuous length it can be cut to lengths accommodating a variety of generator lengths. Extrusion of the body part also allows the provision of an integral bag ring retaining shelf, screw slots for attaching the end plates, stop lugs for adding, externally of the gas generator, gas modifying screens, and slots for attachment of a protective cover for the bag.

The end plates, made of aluminum, are also of extruded shape and thus enable a reduction in the amount of machining required. The end plates retain the shape of the body part, hold the gas generator in place, properly indexed, and provide attachment flanges.

The integral bag ring retaining shelf is located below the outside limits or boundary of the reaction can. This allows for the use of a tether strap at the mouth of the can to absorb the spreading loads caused by bag deployment. The arrangement allows for the tether strap to be pushed down around the gas generator and the bag then folded over it.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

DESCRIPTION OF THE DRAWINGS

With this description of the invention, a detailed description follows with reference being made to the accompanying drawings which form part of the specification, of which:

FIG. 3 is a front view, with a portion broken away, of a first extruded aluminum end plate of the reaction can;

FIG. 4 is a top plan view of the end plate of FIG. 3;

FIG. 5 is a side view, partly in section, of the end plate of FIG. 3;

FIG. 6 is a front view, with a portion broken away, of a second extruded aluminum end plate of the reaction can;

FIG. 7 is a top plan view of the end plate of FIG. 6;

FIG. 8 is a side view, partly in section, of the end plate of FIG. 6;

DESCRIPTION OF THE PREFERRED EMBODIMENT

Figure 1:
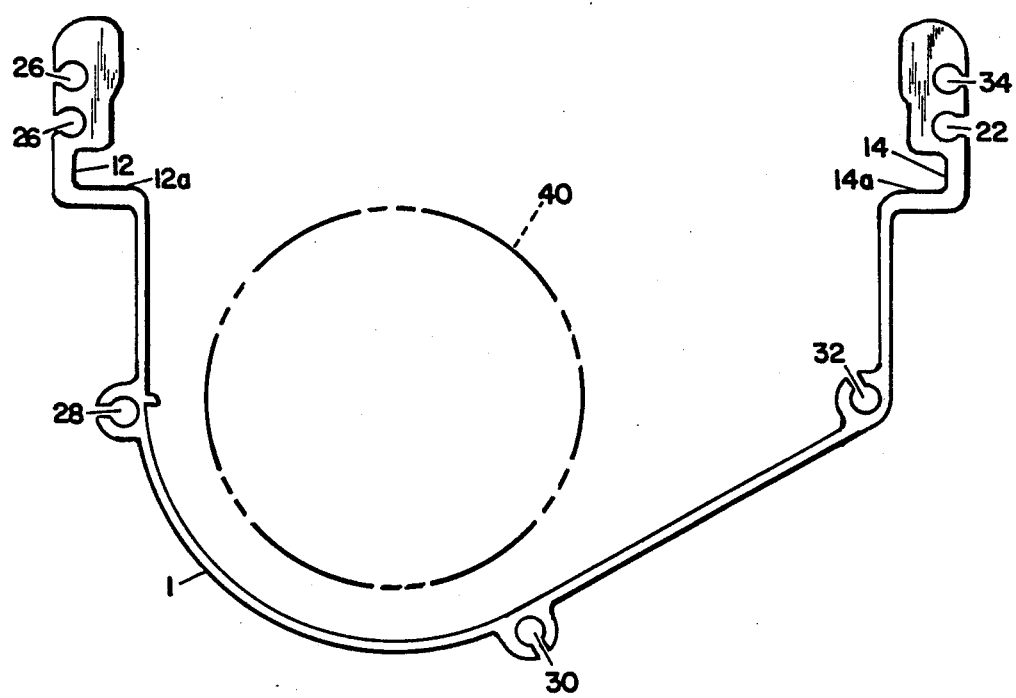
FIG. 1 is an end view of the extruded aluminum body part of the reaction can.
Figure 2:
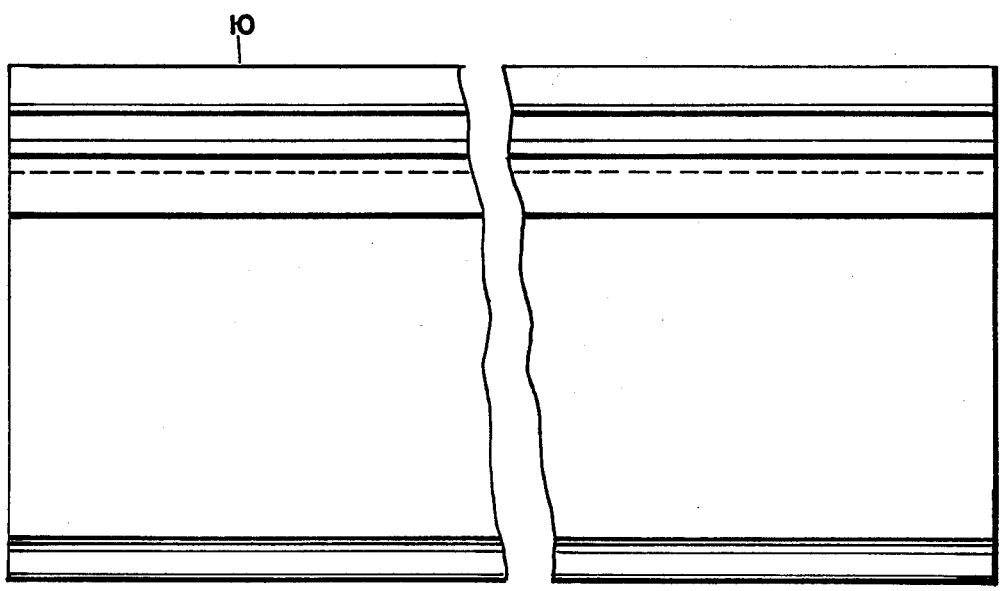
FIG. 2 is a fragmented front view of the body part of FIG. 1.
Figure 9:
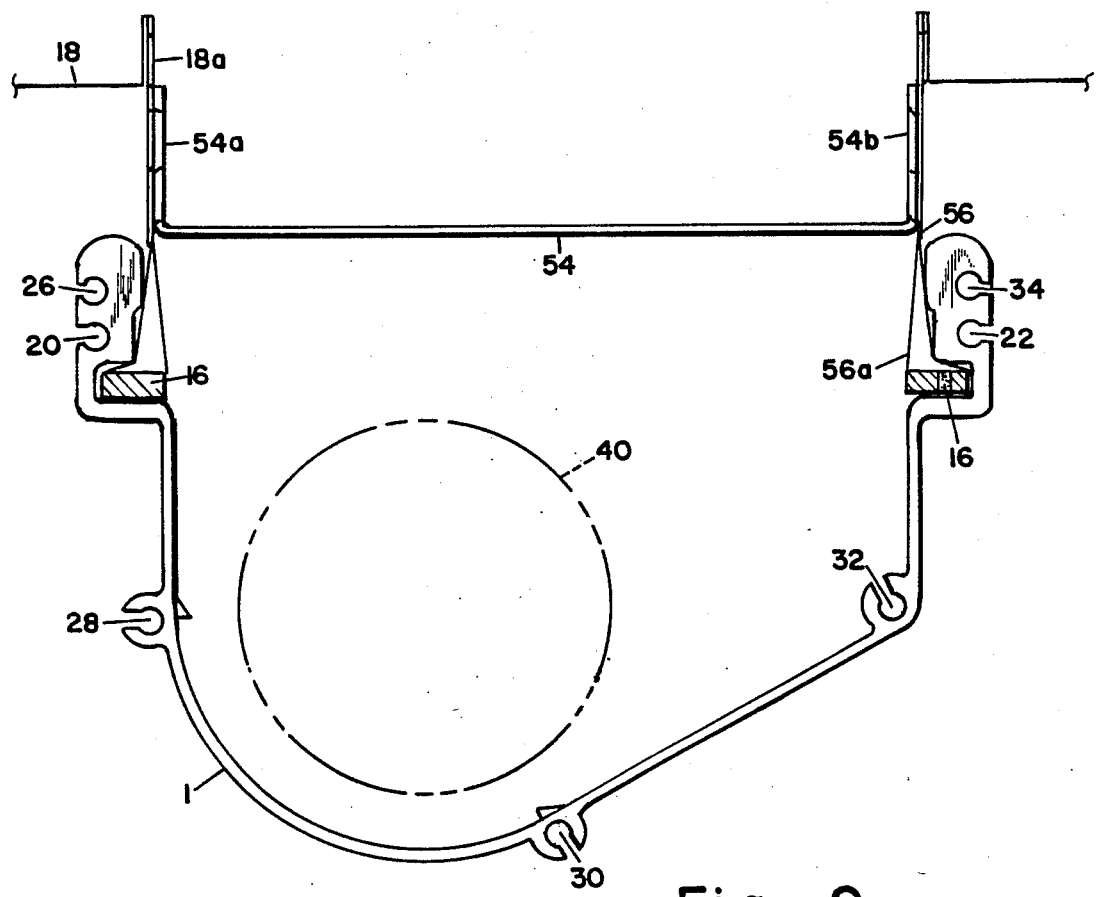
FIG. 9 is an end view of the body part of the reaction can and illustrates the manner of attachment thereto of the inflatable bag.
Figure 10:
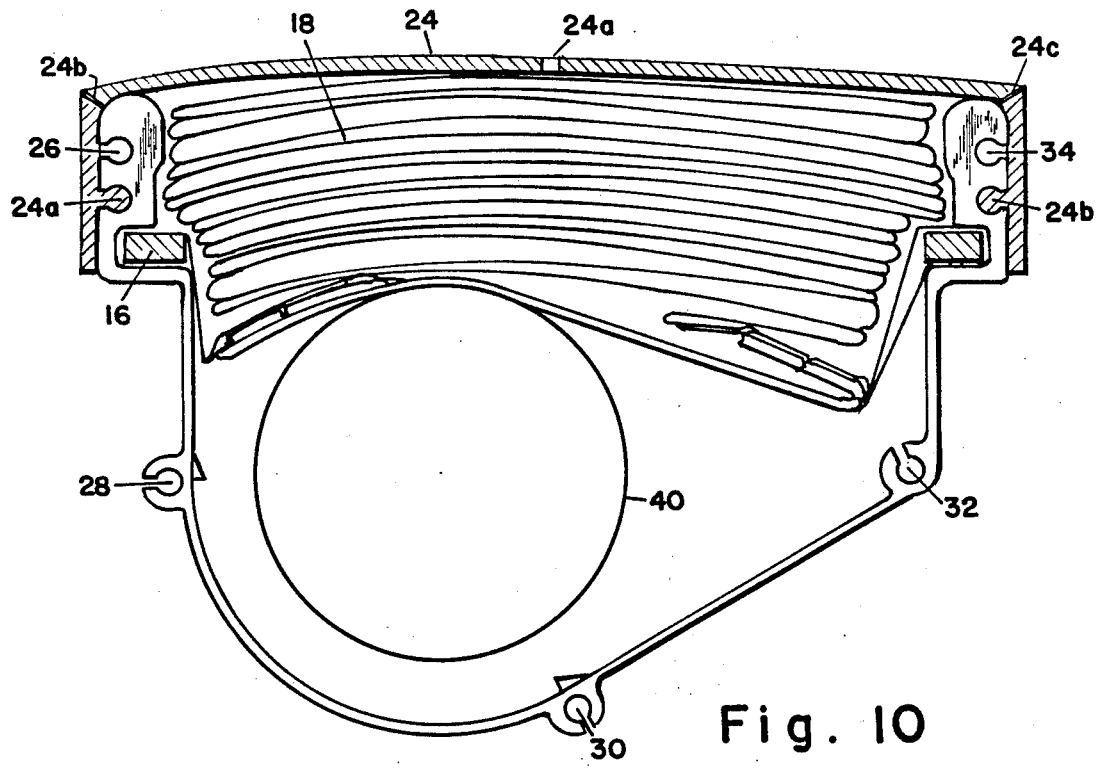
FIG. 10 is an end view, with the end plate removed, showing the gas generator and inflatable bag assembled in the reaction can.

A light weight reaction can 1 according to the invention, as shown in the drawings, includes an elongated body part 10. Body part 10, as seen in FIGS. 1 and 2, has the form of an asymmetrical long, narrow, open receptacle or trough having opposite side walls and a rounded bottom wall. Formed on the inner side of each of the walls of the body part 10, adjacent to but spaced from the upper edges thereof, is a notch. These notches, designated by reference numerals 12 and 14, respectively, form a respectively associated bag retaining ring shelf 12a and 14a for retaining a continuous attachment ring 16 formed at the gas inlet opening or throat 18a of an inflatable bag 18, as shown in FIGS. 9 and 10. The fabrication of inflatable bag 18 may be conventional, as known in the art.

Also formed in the body part 10 on each of the outer side walls adjacent the upper edges thereof is a respectively associated groove 20 and 22 for retaining a cover 24 for the reaction can 1. Thus, cover 24 includes depending portions 24a and 24b on opposite sides thereof which are adopted to snap into a respectively associated groove 20 and 22 for retaining cover 24 to the body part 10. Cover 24 may be made of any material suitable for serving a decorative function on the dash panel of the automobile in which the restraint system is installed as well as providing protection for the inflatable bag 18. Additionally, five spaced retaining screw grooves, designated respectively, 26, 28, 30, 32 and 34, are provided at each end of the body part 10 for retaining thereat a respectively associated first end plate 36 and a second end plate 38.

The fabrication of the body part 10 may be of continuous aluminum extrusion and may be cut to lengths accommodating a variety of lengths of the gas generator employed in the restraint system. The end plates 36 and 38 may also be made of aluminum and have an extruded shape that reduces the amount of machining required. The end plates 36 and 38 retain the shape of the elongated body part 10 and hold an elongated cylindrical gas generator 40 in place, properly indexed.

The external housing of the generator 40 may be of extruded aluminum fabrication, as disclosed in the aforementioned Donald R. Lauritzen application Ser. No. 372,994. The generator may be of the single stage radial type or the dual stage radial type disclosed in the Lauritzen application. For indexing the generator 40 the end plate 36 is provided with a flange seat 42, as shown in FIGS. 3 and 4, and the end plate 38 is provided with a flange seat 44, as shown in FIGS. 6 and 7. End plate 38 also is provided with an index hole 46 for facilitating the indexing of the generator. Alternatively, if desired, such an index hole could be provided in the end plate 36. An ignition port 48 for facilitating the connection of an ignition initiating signal to the generator 40 responsively to an incipient collision is provided concentric with the flange seat 42, as shown in FIG. 3.

End plates 36 and 38, additionally, are each provided with a respective projecting portion or shoulder 36a and 38a for retaining the attachment ring 16 of the inflatable bag 18 at the associated end of the reaction can 1. To that end the positions of shoulders 36a and 38a are such as to be in alignment with the notches 12 and 14 upon assembly of the plates 36 and 38 to the opposite ends of the body part 10.

For attaching the reaction can 1 to the panel of an automobile in which the restraint system is to be installed, each of the end plates 36 and 38 is provided with a reaction can attachment flange, specifically a flange 50 formed on end plate 36 and a flange 52 formed on end plate 38, as best seen in FIGS. 4 and 7, respectively.

For absorbing the spreading loads on the side walls of the reaction can 1 caused by the deployment of the inflatable bag 18, there is provided a tether strap 54 at the mouth of reaction can 1, as illustrated in FIG. 9. The tether strap 54 has opposed ends 54a and 54b and is positioned transversely of the reaction can 1, intermediate the ends thereof, preferably at a central location. The opposed ends 54a and 54b are attached to the attachment ring 16 by a band 56 of suitable material which may be a fabric such as inflatable bag throat material. Band 56 includes a continuous loop 56a that encircles the ring 16 completely around the perimeter thereof. The manner of attachment of the tether strap to the band 56 and that also of the throat 18a of the inflatable bag 18 to the band 56 may be by sewing, using an appropriately strong thread. The attachment of the band 56 to the throat 18a is in a suitable sealing manner.

The location of the notches 12 and 14 below the outside or boundary of the reaction can at the mouth thereof makes possible the use of tether strap 54 and allows the latter to be pushed down around the generator 40, with the inflatable bag 18 then being folded over it, as shown in FIG. 10.

Cover 24 for the reaction can 1, as shown in FIG. 10, is provided with a break seam 24a along a central longitudinal region thereof. Additionally, a hinge 24b is provided along one longitudinal edge of cover 24 and a hinge 24c is provided along the other longitudinal edge.

In the operation of the passive restraint system, when a sensor (not shown) detects the occurrence of a collision, the gas generator 40 is activated and inflation gases pass through openings (not shown) in the cylindrical shell thereof into the reaction can 1 and against the inflatable bag 18. The resulting pressure forces open the cover 24 causing it to rupture along the break seam 24a. After the cover 24 has thus been ruptured and forced open with the opposite halves thereof swinging on the hinge 24b and 24c, respectively associated therewith, the inflatable bag 18 begins deployment. Spreading loads at the mouth of the reaction can 1 caused by bag deployment are absorbed by the tether strap 54.

Thus, in accordance with the invention, there has been provided an improvement in the structure for housing and positioning the gas generator and inflatable bag of a passenger side inflation passive restraint system. The invention is characterized in its provision of a lightweight simple can assembly. A feature of the invention is the inclusion of a tether 54 in the throat 18a of the inflatable bag 18, flush with the mouth of the reaction can 1 and at its center which is operative to retain the spreading forces at the mouth of the reaction can 1 upon deployment of the bag 1. This enables the use of a lighter section at the mouth of the reaction can 1, and eliminates the need for flanges along the sides of the reaction can 1, which flanges would undesirably increase the envelope, that is, the overall dimensions of the reaction can 1.

With this description of the invention in detail, those skilled in the art will appreciate that modifications may be made to the invention without departing from its spirit. Therefore, it is not intended that the scope of the invention be limited to the specific embodiment illustrated and described. Rather, it is intended that the scope of the invention be determined by the appended claims and their equivalents.

What is claimed is:

1. A lightweight reaction can for vehicle passenger inflators comprising,
   a trough-shaped body part having opposite ends, opposite side walls, and a bottom wall with an inflatable bag ring retaining notch on the inner side of each side wall, said body part further having inflatable bag cover retaining grooves on the outer side of each side wall, and a plurality of end plate attachment grooves on each opposite end,
   first and second end plates attached to a respectively associated opposite end of said body part by means positioned in cooperative relation with the respective end plate attachment grooves, each of said first and second end plates acting to retain the shape of said body part and having a shoulder facing inwardly of said body part and positioned to be in substantial alignment with the inflatable bag retaining notches on the inside walls thereof, each of said first and second end plates further having a reaction can attachment flange and a gas generator flange seat positioned to receive and to support an associated one of the ends of an elongated inflator gas generator positioned therein, and a cover for the reaction can to protect an inflator inflatable bag positioned therein, said cover being retained on said reaction can by said inflatable bag cover retaining grooves on the outer side of each side wall of said body part.

2. A lightweight reaction can as defined by claim 1 wherein said cover includes depending portions that snap into said inflatable bag cover retaining grooves on the outer side of each side wall of said body part, said cover having a separate hinge adjacent each side wall of said body part and a break seam intermediate said hinges, whereby, upon initiation of the inflator gas generator and deployment of the inflator inflatable bag, said cover is operative to separate at said break seam with the result that each of the separated cover portions swing open on the hinge associated therewith.

3. A lightweight reaction can as defined by claim 1 further including, an inflatable bag ring, a tether strap having opposed ends and being of such length and strength as to be operative to absorb loads tending to spread the side walls of said body part upon inflation of an inflator inflatable bag positioned in the reaction can, a band attached to said inflatable bag ring by a continuous loop formed therein, and means attaching the opposed ends of said tether strap to opposed inner portions of said band.

4. A lightweight reaction can as defined by claim 3 wherein said band is made of inflatable bag throat material and the opposed ends of said tether strap are attached thereto by sewing.

5. A lightweight reaction can as defined by claim 4 wherein the fabrication of said body part is of continuous aluminum extrusion.

6. A lightweight reaction can as defined by claim 5 wherein said end plates are an extruded shape reducing the amount of machining.

7. A lightweight reaction can as defined by claim 1 further including an ignition port in at least one of said first and second end plates, said ignition port being positioned in concentric relation with the associated gas generator flange seat of said one end plate.

8. A lightweight reaction can for vehicle passenger inflators comprising, a trough-shaped body part having opposite ends, opposite side walls, and a bottom wall with an inflatable bag ring retaining notch on the inner side of each side wall, said body part further having inflatable bag cover retaining grooves on the outer side of each side wall, and a plurality of end plate attachment grooves on each opposite end, the fabrication of said body part being of continuous aluminum extrusion, first and second end plates attached to a respectively associated opposite end of said body part by screw means positioned in cooperative relation with the respective end plate attachment grooves, each of said end plates having an extruded shape reducing the amount of machining and acting to retain the shape of said body part, each of said end plates further having a shoulder facing inwardly of said body part and positioned to be in substantial alignment with the inflatable bag retaining notches on the inside walls thereof, each of said end plates further having a reaction can attachment flange and a gas generator flange seat positioned to receive and to support an associated one of the ends of an elongated inflator gas generator positioned therein, with at least one of said end plates having an ignition port positioned therein in concentric relation with the associated gas generator flange seat of said one end plate, an inflatable bag ring, a tether strap having opposed ends and being of such length and strength as to be operative to absorb loads tending to spread the side walls of said body part upon inflation of an inflatable bag positioned in the reaction can, a band attached to said inflatable bag ring by a continuous loop formed therein, said band being made of inflatable bag throat material, means attaching by sewing the opposed ends of said tether strap to opposed inner portions of said band, and a cover for the reaction can to protect an inflator inflatable bag positioned therein, said cover being retained on said reaction can by said inflatable bag cover retaining grooves on the outer side of each side wall of said body part, said cover including depending portions that snap into said inflatable bag cover retaining grooves on the outer side of each side wall of said body part, said cover having a separate hinge adjacent each side wall of said body part and a break seam intermediate said hinges, whereby, upon initiation of the inflator gas generator and deployment of the inflator inflatable bag, said cover is operative to separate at said break seam with the result that each of the separated cover portions swing open on the hinge associated therewith.

* * * * *